Figure 1:
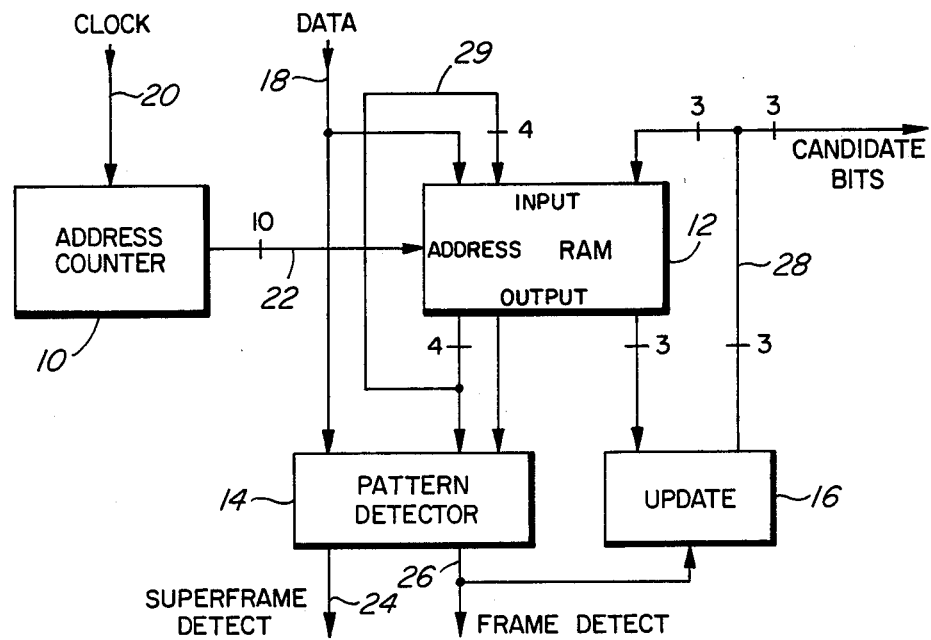

United States Patent [19]

Graves et al.

[11] Patent Number: 4,622,666
[45] Date of Patent: Nov. 11, 1986

[54] CIRCUITS FOR DETECTING FRAMING BITS IN A T.D.M. BIT STREAM

[75] Inventors: Alan F. Graves, Sherwood Park; Paul A. Littlewood; Johannes S. Weiss, both of Edmonton, all of Canada

[73] Assignee: Northern Telecom Limited, Montreal, Canada

[21] Appl. No.: 680,436

[22] Filed: Dec. 10, 1984

[51] Int. Cl.[4] .............................................. H04J 3/06
[52] U.S. Cl. .................................... 370/100; 370/105
[58] Field of Search ................. 370/100, 105; 375/106

[56] References Cited

U.S. PATENT DOCUMENTS

| | | | |
|---|---|---|---|
| 3,903,371 | 9/1975 | Colton et al. | 370/105 |
| 3,928,726 | 12/1975 | Colton et al. | 370/105 |
| 4,298,987 | 11/1981 | Stattel et al. | 375/106 |
| 4,301,534 | 11/1981 | Genter | 370/105 |

OTHER PUBLICATIONS

AT&T Technical Advisory No. 70, Issue No. 2, Sep. 29, 1981.

Primary Examiner—Douglas W. Olms
Assistant Examiner—Kenneth I. Rokoff
Attorney, Agent, or Firm—R. John Haley

[57] ABSTRACT

A framing circuit is disclosed for detecting framing bits in a t.d.m. bit stream having an extended DS1 framing format. The circuit comprises a RAM for storing in respect of each of the 772 time channels the five most recent information bits of the time channel and three other, candidate, bits which represent the likelihood that the particular time channel carries the framing bit pattern. The current and five stored information bits of each time channel are checked to detect the six-bit framing bit pattern. The candidate bits have their value increased or decreased, within predetermined limits, in dependence upon whether or not a phase of the framing bit pattern is detected, and the updated information and candidate bits are stored in the RAM. The modification of the candidate bits in this manner is effected in only every third 772-bit frame. A framing signal is produced in dependence upon the candidate bits.

14 Claims, 6 Drawing Figures

CIRCUITS FOR DETECTING FRAMING BITS IN A T.D.M. BIT STREAM

This invention relates to framing circuits for detecting framing bits in a t.d.m. bit stream.

In a so-called T1 or DS1 bit stream, t.d.m. frames each containing one framing bit and 24 8-bit channels (193 bits per frame) are transmitted at a frame rate of 8kHz. A predetermined pattern formed by the framing bits in successive frames is detected by a framing circuit to establish frame synchronization at a receiver of the transmission system.

It has been proposed (American Telephone and Telegraph Company, Technical Advisory No. 70, Issue 2, Sept. 29, 1981) to provide an extended DS1 framing format in which the first bit of the frames is used for cyclic redundancy checking and data transmission as well as frame synchronization. In the extended framing format a framing bit is sent only in every fourth frame, i.e. every 772 bits, six successive framing bits forming a framing pattern 001011 which is repeated in superframes each comprising 24 frames.

It is known to provide a framing circuit, for detecting a framing bit pattern, which comprises a shift register through which the bit stream is shifted and within the storage locations of which the framing pattern bits are detected. For rapidly and reliably distinguishing the framing bits from the remainder of the bit stream, a large shift register capable of storing several frames is required, leading to difficulties in providing the framing circuit as an integrated circuit, as is desired. These difficulties are exacerbated by the extended framing format, in which a framing bit occurs in only every four frames.

It is also known from Genter U.S. Pat. No. 4,301 534 to provide a framing circuit which comprises two memories, namely a RAM and a ROM. The ROM stores a set of correlation states in a predetermined sequence, and the RAM is used as a recirculating memory to store a correlation state for each time slot of the bit stream, this being used with the incoming bit stream to address the ROM and update the correlation state in the RAM. Frame synchronization is established when, for a particular time slot, a particular range of correlation states is reached. Again, providing this framing circuit as an integrated circuit leads to difficulties because of the need for both a ROM and a RAM as well as other circuitry.

Accordingly an object of this invention is to provide an improved framing circuit.

According to this invention there is provided a framing circuit for detecting framing bits in a predetermined framing bit pattern in a time channel of a t.d.m. bit stream, comprising: a RAM for storing in respect of each time channel a plurality of most recent information bits of the time channel and one or more other bits; means for detecting the framing bit pattern in the current and stored information bits of each time channel; means for modifying said other bits for the respective time channel in dependence upon such detection; and means for producing a framing signal in dependence upon said other bits.

The framing circuit thus comprises a RAM and other circuitry, and can be conveniently implemented using two integrated circuit devices, namely a commercially available RAM and a specifically designed integrated circuit providing the remainder of the circuitry functions, at relatively low complexity and cost.

The framing circuit conveniently comprises means for cyclically addressing the storage locations of the RAM, means for reading said information bits and said other bits from each addressed location, and means for writing the updated information bits and updated other bits to the addressed location.

Preferably the means for modifying said other bits is responsive to the cyclically addressing means to modify said other bits of each time channel in only one of every n address cycles, where n is a plural integer. For example, n=3.

The means for modifying said other bits for the respective time channel in dependence upon the framing bit pattern detection conveniently comprises means for incrementing said other bits, up to a predetermined maximum value, in response to detection of the pattern, and means for decrementing said other bits, down to a predetermined minimum value, in response to no detection of the pattern. The means for modifying said other bits advantageously further comprises means for selectively passing said other bits without modification thereof, and means for selectively setting said other bits for each time channel to a predetermined value.

Preferably the means for detecting the framing bit pattern comprises means for detecting each of a plurality of phases of the pattern in the current and stored information bits of each time channel and for producing a frame detection signal in response to detection of any of said phases, and means for producing a superframe detection signal in response to detection of a predetermined one of said phases.

The means for producing a framing signal in dependence upon said other bits preferably comprises means for comparing said other bits with a predetermined threshold value and for producing the framing signal in respect of a time channel in response to said other bits of the time channel exceeding the threshold, and preferably further comprises means for comparing said other bits with a second predetermined threshold value and for terminating the production of the framing signal in repect of a time channel in response to said other bits of the time channel falling below the second threshold.

If the RAM stores a plurality of p information bits and a plurality of q said other bits in respect of each time channel, where p and q are integers, then preferably $p+q \leq 8$. For convenience, $p=5$ and $q=3$ so that $p+q=8$. These values of p and q take advantage of available RAM sizes; for the case of $n=772$ for the extended framing format referred to above, a 1K by 8-bit RAM can conveniently be used.

Figure 2A:
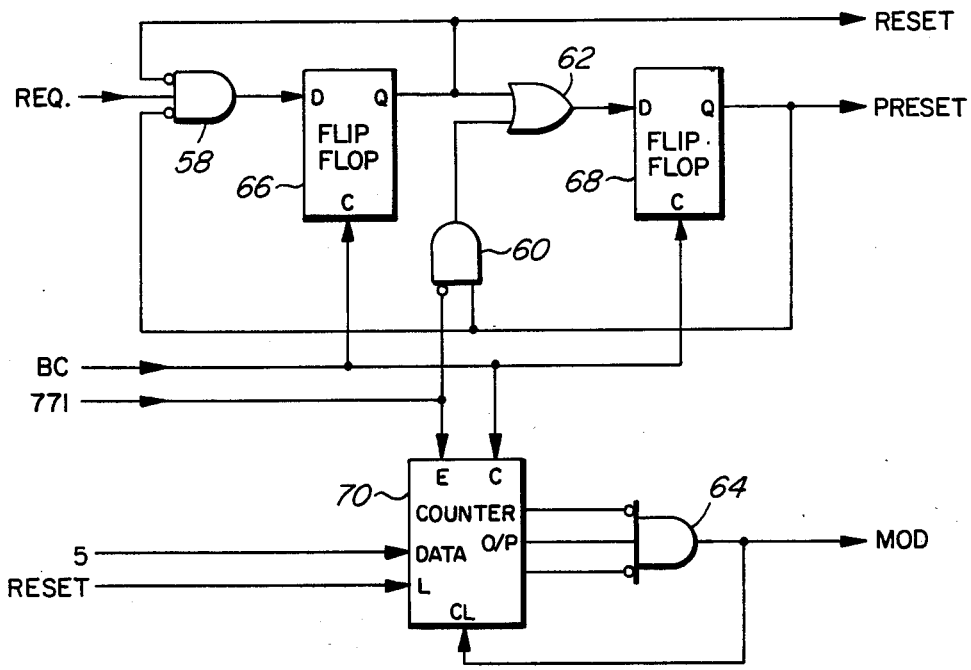
Figure 2B:
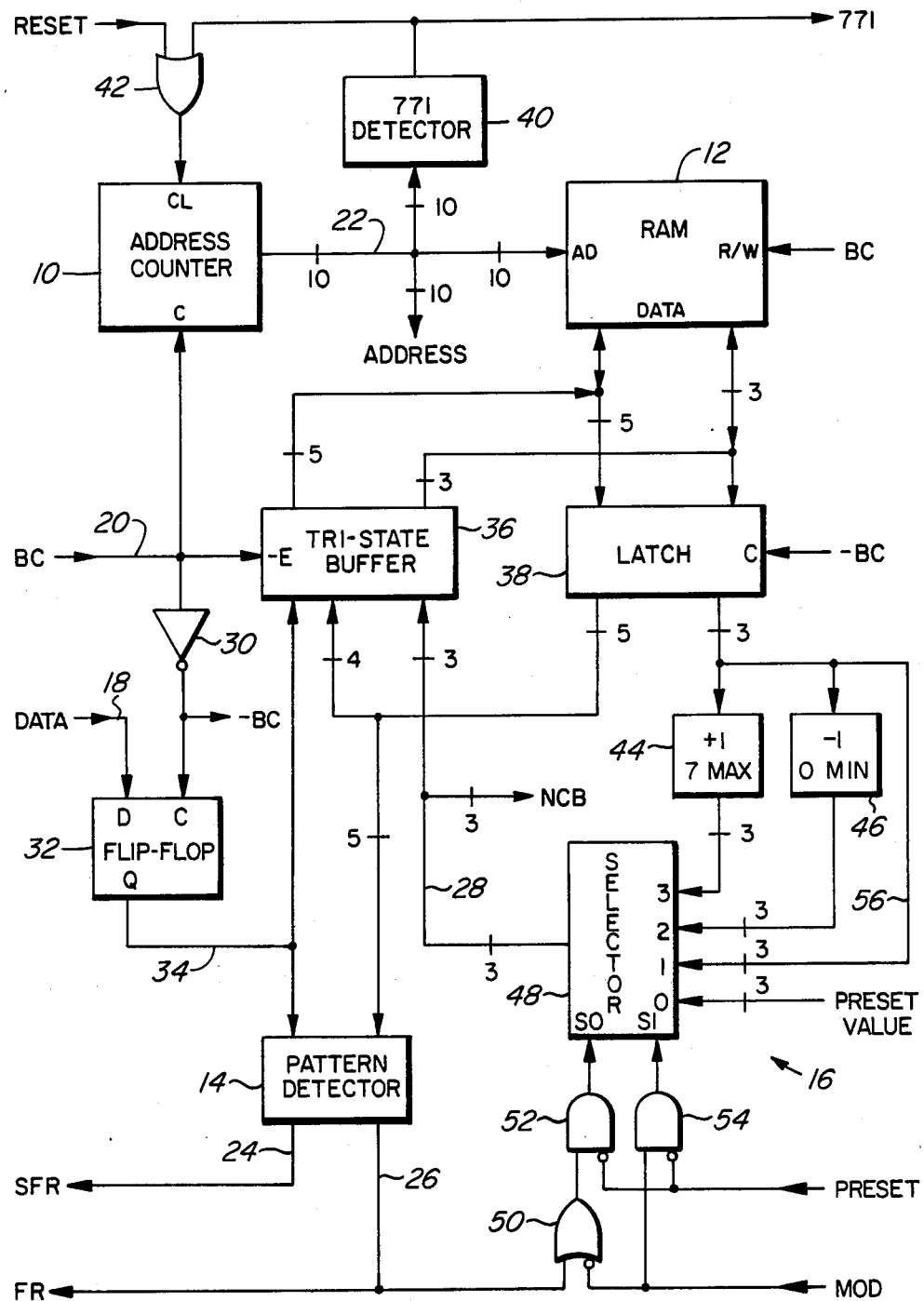
Figure 2C:
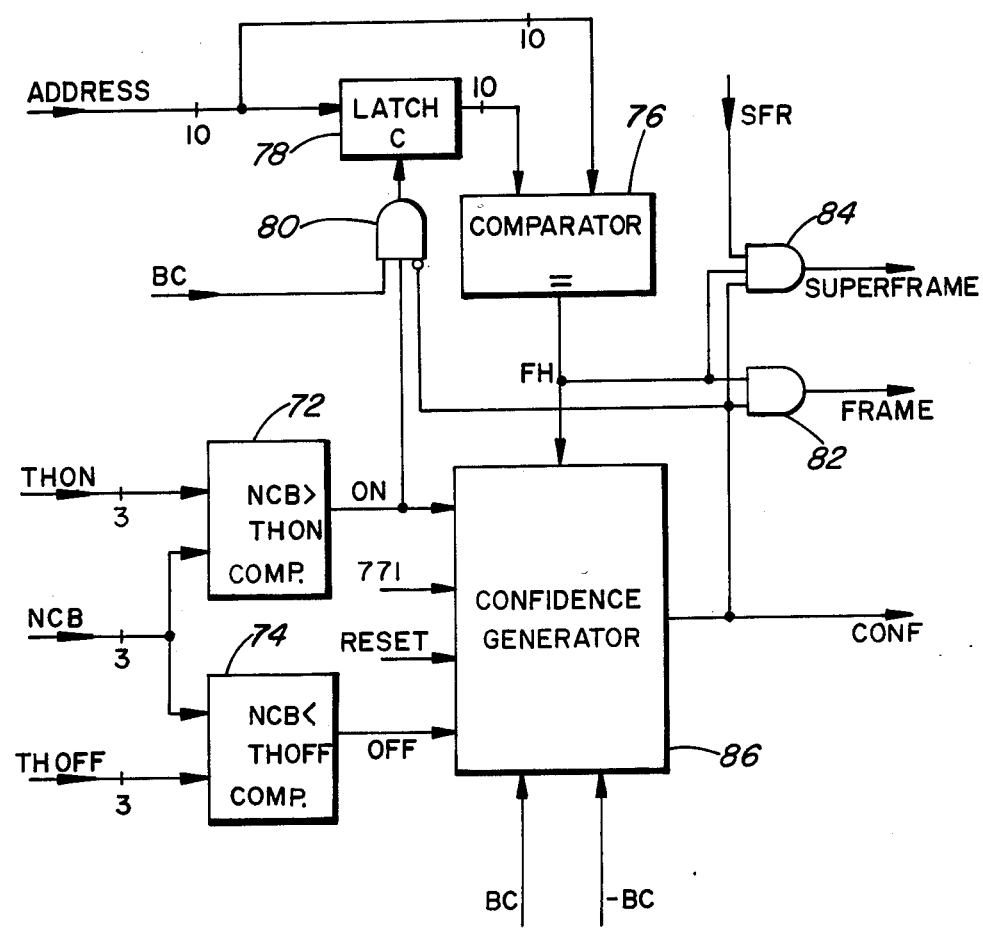
Figure 3:
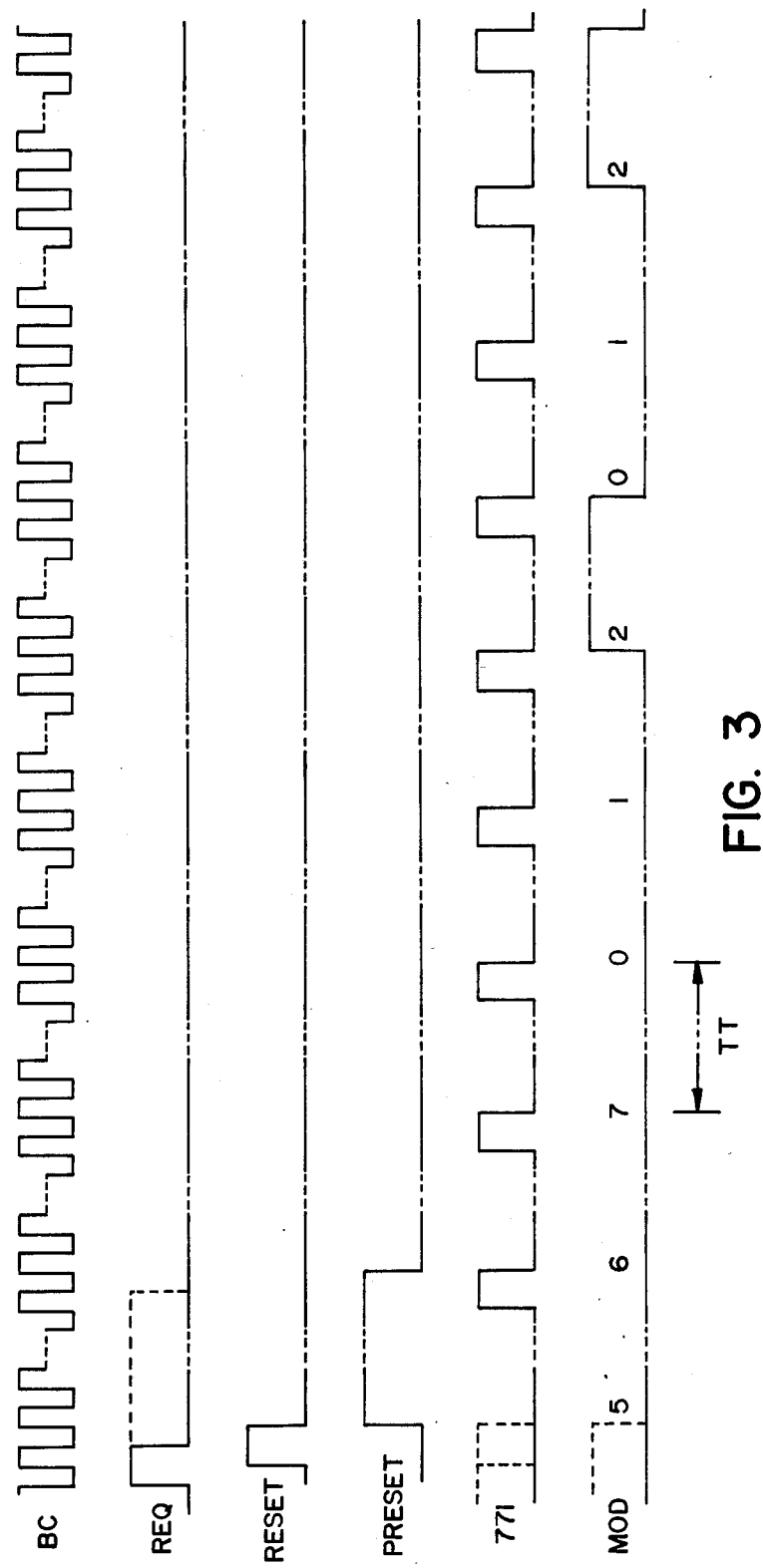
Figure 4:
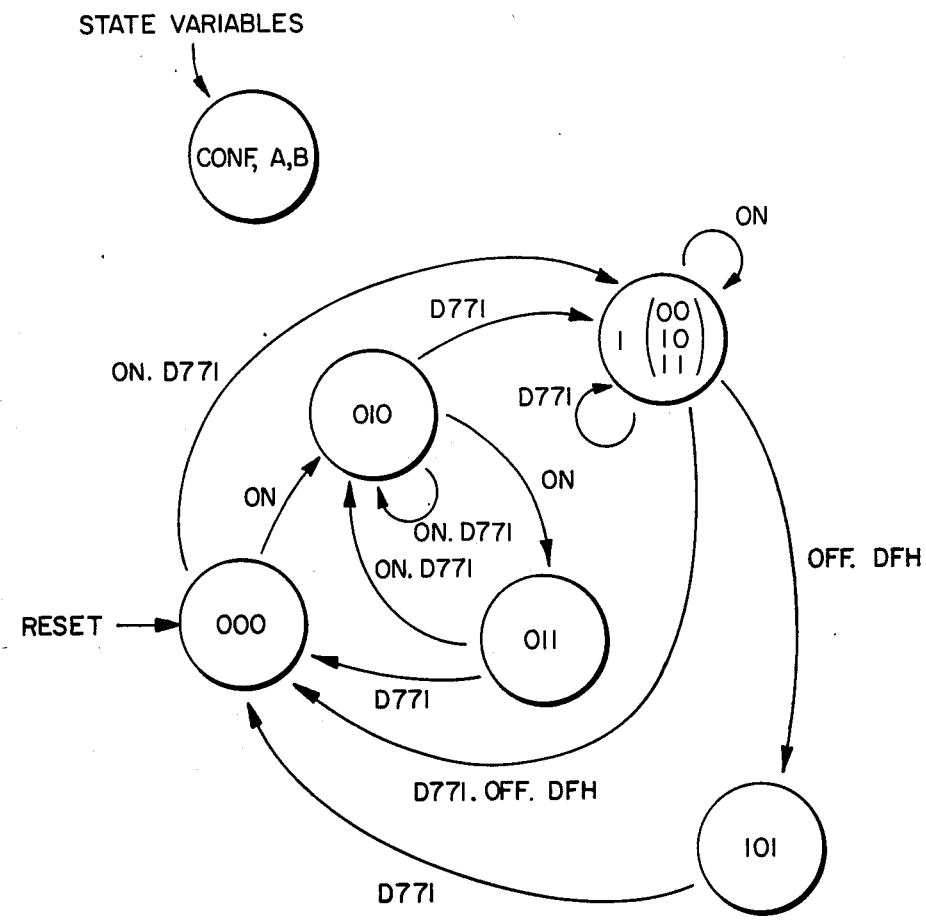

The invention will be further understood from the following description with reference to the accompanying drawings, in which:

FIG. 1 schematically illustrates in a block diagram parts of a framing circuit in accordance with the invention;

FIG. 2, comprising FIGS. 2a, 2b, and 2c, schematically illustrates in greater detail parts of the framing circuit;

FIG. 3 is a diagram illustrating the timing of signals which may occur in operation of the framing circuit; and FIG. 4 is a state diagram illustrating the operation of a confidence generator of the framing circuit.

The framing circuit described below is intended for detecting the framing pattern in the extended DS1 framing format described above.

Referring to FIG. 1, the framing circuit comprises an address counter 10, a RAM 12, a pattern detector 14, and an update circuit 16. An incoming t.d.m. bit stream in the extended DS1 framing format is supplied on a line 18, labelled DATA, to a data input of the RAM 12 and to an input of the pattern detector 14. A clock signal at the bit-rate of the bit stream is supplied via a line 20 to the address counter 10, which in response to the clock signal is arranged to count cyclically through 772 addresses which are produced on a 10-bit wide address bus 22 and are applied to address inputs of the RAM 12.

Each of the 772 locations of the RAM 12 which is addressed in the above manner stores 8 bits of information, of which 5 bits are derived from a respective time channel of the bit stream and the remaining 3 are referred to as candidate bits and are a measure of the likelihood that the particular time channel contains the framing pattern. Thus the RAM 12 can conveniently be a commerically available 1K by 8 bit RAM.

For each address supplied via the bus 22, and hence for each time channel, the contents of the corresponding location of the RAM 12 are read out, the 3 candidate bits being supplied to the update circuit 16 and the 5 data bits being supplied to the pattern detector 14, which is also supplied with the current data bit of the time channel. The pattern detector 14 determines whether the 6 bits with which it is supplied correspond to the framing bit pattern 001011, and if so produces a superframe detect signal on a line 24 and a frame detect signal on a line 26. The pattern detector 14 also determines whether the 6 bits correspond to a different phase of the framing pattern, i.e. to one of the cyclically rotated framing bit patterns 010110, 101100, 011001, 110010, and 100101, and if so also produces the frame detect signal on the line 26.

The frame detect signal on the line 26 is supplied to the update circuit 16, which in dependence upon the frame detect signal modifies the candidate bits, for example by incrementing their binary value to a maximum count of 7 in the presence of the frame detect signal and by decrementing their binary value to a minimum count of 0 in the absence of this signal.

The modified candidate bits on lines 28, the current data bit of the time channel on the line 18, and the most recent four of the five previously stored data bits of the time channel on lines 29, are supplied to respective data inputs of the RAM 12 and are stored therein at the relevant addressed location. In this manner the RAM 12 is arranged continuously to store the updated candidate bits with the most recent 5 data bits for each time channel. The candidate bits on the lines 28 provide an indication of the likelihood that the current time channel is the framing time channel, and are used to determine when a framing signal is produced as described further below.

Referring to FIG. 2, comprising FIGS. 2a, 2b, and 2c, the framing circuit will be described in greater detail, similar references to those above being used where appropriate.

The clock signal on the line 20 is represented in FIG. 2 by an incoming bit-clock signal BC, which is inverted by an inverter 30 to produce a signal −BC. The incoming data or t.d.m. bit stream on the line 18 is delayed by half a cycle of the signal BC by being passed through a D-type flip-flop 32 clocked by the signal −BC, the data being applied via a line 34 to the pattern detector 14 and a tri-state buffer 36. The buffer 36 and a latch 38 respectively supply data to and receive data from the RAM 12 via a data port thereof. To this end, reading from and writing to a location in the RAM 12 which is addressed via the bus 22 and RAM address inputs AD are controlled by the signal BC applied to a read/write control input R/W of the RAM 12, in conjunction with the signal −BC supplied to a clock input C of the latch 38 and the signal BC supplied to an inverting enable input −E of the buffer 36.

The address counter 10 is a 10-bit counter which is clocked by the signal BC supplied to its clock input C to produce 10-bit counts constituting addresses on the bus 22. A detector 40 detects a count of 771 on the bus 22 and, in response to such detection, produces a signal 771 which is supplied via an OR gate 42 to a clear input CL of the counter 10 to reset its count to 0 on the next pulse of the signal BC. The address counter 10 can be similarly reset to 0 in response to a signal RESET supplied to another input of the OR gate 42.

The update circuit 16 comprises adding and subtracting circuits 44 and 46 respectively, which may be constituted by logic gates, a 1-of-4 3-bit selector 48, and gates 50, 52, and 54. Four 3-bit inputs of the selector 48 are constituted respectivly by a preset value, the unmodified candidate bits derived from the RAM 12 via the latch 38 and lines 56, these bits decreased by one to a minimum value of 0 in the subtracting circuit 46, and these bits increased by one to a maximum value of 7 in the adding circuit 44. The 3-bit output of the selector 48 is supplied via the lines 28 to the buffer 36 to be written into the RAM 12, and also to constitute new candidate bits NCB which are referred to below. The selection by the selector 48 is controlled via two selector inputs S0 and S1 by the gates 50, 52, and 54, which in turn are controlled by signals PRESET, MOD, and FR, the latter signal corresponding to the frame detect signal produced by the pattern detector 14 on the line 26 as described with reference to FIG. 1. The pattern detector 14 also produces a signal SFR corresponding to the superframe detect signal on the line 24. The pattern detector can be constituted by six 6-input AND-gates each for detecting a respective one of the different phases of the framing bit pattern, the outputs of these gates being OR-ed together to produce the signal FR, and the output of the AND-gate which detects the pattern 001011 constituting the signal SFR.

FIG. 2a illustrates how the signals RESET, PRESET, and MOD are produced, the relative timings of these signals being illustrated in FIG. 3, which also shows a request signal REQ and the signals BC and 771. In FIG. 3 one cycle through all of the 772 addresses by the counter 10 is represented by the period TT.

FIG. 2a illustrates gates 58, 60, 62, and 64, D-type flip-flops 66 and 68, and a 3-bit counter 70, the flip-flops and counter being clocked by the signal BC supplied to clock inputs C thereof. The counter 70 also has a clear input CL, an enable input E, and a load input L which is supplied with the signal RESET for loading a value of 5 supplied to its data inputs into the counter.

In response to a request signal REQ=1 supplied via the gate 58 when the signals RESET=0 and PRESET=0, as is normally the case, the flip-flop 66 produces the signal RESET=1, in response to which the counter 70 is loaded with the count of 5 and the address counter 10 is cleared. The signal RESET=1 is fed back to an inhibit input of the gate 58 to limit the duration of this signal to one period of the signal BC. The signal RESET=1 is also supplied via the OR-gate 62 to the flip-flop 62, which in response to the next pulse of the signal BC produces the signal PRESET=1. This signal inhibits any subsequent request signal REQ=1 via the gate 58, and via the gates 60 and 62 maintains the signal PRESET=1 for the duration TT of one complete cycle of addresses of the address counter 10, until the signal 771 becomes 1 to inhibit the gate 60. During this cycle the gates 52 and 54 are inhibited so that the selector 48 supplies the preset value supplied to one of its inputs to the buffer 37 to be stored as the candidate bits of all of the 772 locations in the RAM 12, whereby all of the time channels are given the same initial likelihood of being the framing bit time channel.

The gate 64 produces the signal MOD=1 for the duration of one 772 address cycle when the counter 70 has reached a count of 2. As the counter 70 is initially set to a count of 5-and is a 3-bit counter having a maximum count of 7, with successive pulses of the signal 771 supplied to its enable input E it counts through the counts 6, 7, 0, and 1 as shown in FIG. 4 before reaching the count of 2. Thus after a reset request 5 772 address cycles take place, allowing all of the data bits stored in the RAM 12 to be replaced, before the signal MOD=1 is produced. This signal is fed back to the clear input CL of the counter 70 so that the counter 70 is reset to 0 at the end of the address cycle in which the signal MOD=1 is produced. Thereafter the signal MOD=1 is produced during every third address signal, as shown in FIG. 4.

When the signal MOD=0, with the signal PRESET=0, the selector 48 supplies the unmodified candidate bits from the lines 56 to the lines 28. With the signal MOD=1, the selector 48 supplies to the lines 28 the incremented candidate bits from the adder 44 if the signal FR=1, or the decremented candidate bits from the subtracter 46 if the signal FR=0. Thus in every third address cycle the candidate store bits are modified in a manner depending upon whether or not any phase of the framing bit pattern has been detected for the relevant time channel. The modification in only every third address cycle enhances the ability of the framing circuit to distinguish the framing bit time channel from the other time channels by means of the candidate bits, but these could instead be modified every address cycle or at other rates relative to the address cycles.

FIG. 2c illustrates the manner in which the framing signal FRAME and a superframe signal SUPERFRAME are produced in dependence upon the updated candidate bits NCB. The circuitry in FIG. 2c includes comparators 72, 74, and 76, a latch 78, gates 80, 82, and 84, and a confidence generator 86. The confidence generator 86 consists of logic circuits which are responsive to the signals 771, RESET, BC, and −BC, and signals ON, OFF, and FH produced by the comparators 72, 74, and 76 respectively, to produce a confidence signal CONF which is a logic 1 when the FRAME and SUPERFRAME signals are valid, i.e. when frame and superframe synchronization has been established. FIG. 4 shows a state diagram for the confidence generator and from which a suitable logic circuit arrangement for the confidence generator can be provided by any one of ordinary skill in the art. In FIG. 4 the signals D771 and DFH represent delayed versions of the signals 771 and FH respectively, and A and B are variables internal to the confidence generator.

The candidate bits are compared in the comparators 72 and 74 with thresholds THON and THOFF respectively (THON>THOFF). For example THON=6 and THOFF=1. When the candidate bits of any time channel exceed THON, the comparator 72 produces the signal ON. If at this time the signal CONF=0, i.e. if frame synchronization has not been established, then the gate 80 is enabled so that with the signal BC=1 the latch 78 is clocked to store the address from the bus 22 corresponding to the time channel. The stored address is subsequently compared with the current address by the comparator 76, which produces the signal FH=1 each time the addresses are the same, i.e. for each bit of the framing bit time channel. As shown in FIG. 4, the confidence generator is responsive to the signal ON and the signal D771 to produce the signal CONF=1 instead of the CONF=0 if the signal ON is produced for one and only one time channel in the frame, i.e. between two consecutive pulses of the signal D771. If the signal ON is produced in respect of more than one time channel, the signal CONF remains 0 until the above conditions are satisfied. Ultimately, in response to the signal CONF=1 the gate 80 is inhibited and the gates 82 and 84 are enabled to produce the signals FRAME and SUPERFRAME in dependence upon the signals FH and SFR.

With the signal CONF=1, the confidence generator is responsive to the signals DFH and OFF, the latter being produced by the comparator 74 if the candidate bits have a value less than the threshold THOFF, to produce the signal CONF=0 if the value of the candidate bits of the time channel selected as the framing bit time channel falls below the threshold THOFF, as would occur as a result of faulty synchronization. In this case the gate 80 is again enabled to allow resynchronization in dependence upon the candidate bits of each time channel.

Although a particular embodiment of the invention has been described in detail, it should be understood that numerous modifications, variations, and adaptations maybe made thereto without departing from the scope of the invention as defined in the claims.

In particular, it is observed that the selections of 5 data bits and 3 candidate bits stored for each time channel in the RAM 12 may be changed, as may be the rate and degree of modification of the candidate bits and their preset value, and the thresholds with which the candidate bits are compared. Furthermore, the invention is equally applicable to other sequences of framing bits and other t.d.m. schemes than that particularly described.

WHAT IS CLAIMED IS:

1. A framing circuit for detecting framing bits in a predetermined framing bit pattern in a time channel of a t.d.m. bit stream, comprising:
  a RAM for storing in respect of each time channel a plurality of most recent information bits of the time channel and one or more other bits;
  means for detecting the framing bit pattern in the current and stored information bits of each time channel;
  means for modifying said other bits for the respective time channel in dependence upon such detection; and
  means for producing a framing signal in dependence upon said other bits.

2. A framing circuit as claimed in claim 1 wherein the RAM comprises an addressable location in respect of each time channel, each location storing said plurality of information bits and said other bits for the respective time channel, the framing circuit comprising means for cyclically addressing said locations, means for reading said information bits and said other bits from the addressed location, and means for writing the updated information bits and updated other bits to the addressed location.

3. A framing circuit as claimed in claim 2 wherein the means for modifying said other bits is responsive to the cyclically addressing means to modify said other bits of each time channel in only one of every n address cycles, where n is a plural integer.

4. A framing circuit as claimed in claim 3 wherein $n=3$.

5. A framing circuit as claimed in claim 1 wherein the means for modifying said other bits for the respective time channel in dependence upon the framing bit pattern detection comprises means for incrementing said other bits, up to a predetermined maximum value, in response to detection of the pattern, and means for decrementing said other bits, down to a predetermined minimum value, in response to no detection of the pattern.

6. A framing circuit as claimed in claim 5 wherein the means for modifying said other bits further comprises means for selectively passing said other bits without modification thereof.

7. A framing circuit as claimed in claim 5 wherein the means for modifying said other bits further comprises means for selectively setting said other bits for each time channel to a predetermined value.

8. A framing circuit as claimed in claim 1 wherein the means for detecting the framing bit pattern comprises means for detecting each of a plurality of phases of the pattern in the current and stored information bits of each time channel and for producing a frame detection signal in response to detection of any of said phases, and means for producing a superframe detection signal in response to detection of a predetermined one of said phases.

9. A framing circuit as claimed in claim 1 wherein the means for producing a framing signal in dependence upon said other bits comprises means for comparing said other bits with a predetermined threshold value and for producing the framing signal in respect of a time channel in response to said other bits of the time channel exceeding the threshold.

10. A framing circuit as claimed in claim 9 wherein the means for producing the framing signal further comprises means for comparing said other bits with a second predetermined threshold value and for terminating the production of the framing signal in repect of a time channel in response to said other bits of the time channel falling below the second threshold.

11. A framing circuit as claimed in claim 1 wherein the RAM stores a plurality of p information bits and a plurality of q said other bits in respect of each time channel, where p and q are integers and $p+q \leq 8$.

12. A framing circuit as claimed in claim 11 wherein $p+q=8$.

13. A framing circuit as claimed in claim 12 wherein $p=5$ and $q=3$.

14. A framing circuit as claimed in claim 13 wherein a bit of the predetermined framing bit pattern occurs in the t.d.m. bit stream every 772 bits thereof, the RAM comprising 772 addressable storage locations.

* * * * *